(12) United States Patent
Debler et al.

(10) Patent No.: US 8,517,419 B2
(45) Date of Patent: Aug. 27, 2013

(54) ACTUATOR SUBASSEMBLY

(75) Inventors: Jens Debler, Iggingen (DE); Martin Sedlmeier, Vilsbiburg (DE); Karl Englbrecht, Erharting (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 223 days.

(21) Appl. No.: 12/688,998

(22) Filed: Jan. 18, 2010

(65) Prior Publication Data

US 2010/0187797 A1 Jul. 29, 2010

(51) Int. Cl.
*B60R 21/2338* (2011.01)
*B60R 21/26* (2011.01)

(52) U.S. Cl.
USPC ......... 280/736; 102/356; 280/741; 280/743.2

(58) Field of Classification Search
USPC .............. 29/428, 453; 89/1.14; 102/275.12, 102/530, 531, 335, 356; 280/736, 737, 740–742, 743.2, 806
See application file for complete search history.

(56) References Cited

U.S. PATENT DOCUMENTS

| | | | | |
|---|---|---|---|---|
| 3,889,703 A * | 6/1975 | Keathley | ........................... | 137/67 |
| 4,288,005 A * | 9/1981 | Soo-Hoo | ........................... | 222/5 |
| 5,482,327 A * | 1/1996 | Schmid | ........................... | 280/806 |
| 5,584,505 A * | 12/1996 | O'Loughlin et al. | ......... | 280/737 |
| 5,716,072 A * | 2/1998 | O'Driscoll | ........................ | 280/740 |
| 6,076,854 A * | 6/2000 | Schenck et al. | ............ | 280/743.2 |
| 6,168,202 B1 * | 1/2001 | Stevens | .......................... | 280/737 |
| 6,390,501 B1 * | 5/2002 | Greib et al. | ................. | 280/743.2 |
| 6,513,835 B2 * | 2/2003 | Thomas | ........................ | 280/743.2 |
| 6,616,184 B2 * | 9/2003 | Fischer | ........................ | 280/743.2 |
| 6,634,671 B2 * | 10/2003 | Heigl et al. | ................. | 280/743.2 |
| 6,648,371 B2 * | 11/2003 | Vendely et al. | ............... | 280/739 |
| 6,918,614 B2 * | 7/2005 | Ryan | ........................... | 280/743.2 |
| 7,192,054 B2 * | 3/2007 | Smith | ........................... | 280/741 |
| 7,240,917 B2 * | 7/2007 | Fogle et al. | .................... | 280/739 |
| 7,275,763 B2 * | 10/2007 | Thomas et al. | ............. | 280/743.2 |
| 7,374,205 B2 * | 5/2008 | Thomas | ........................ | 280/743.2 |
| 7,469,926 B2 * | 12/2008 | Lewis et al. | .................... | 280/736 |
| 7,490,854 B2 * | 2/2009 | Thomas | ........................ | 280/739 |
| 7,510,211 B2 * | 3/2009 | Clark | ............................. | 280/741 |
| 7,681,913 B2 * | 3/2010 | Thomas | ........................ | 280/736 |
| 7,690,683 B2 * | 4/2010 | Parks et al. | ................. | 280/743.2 |

(Continued)

FOREIGN PATENT DOCUMENTS

| | | |
|---|---|---|
| DE | 10210328 | 10/2002 |
| DE | 102004042359 | 5/2005 |

(Continued)

OTHER PUBLICATIONS

Dictionary.com "snap fastener" definition. Apr. 30, 2012.*

*Primary Examiner* — Joseph Rocca
*Assistant Examiner* — Laura Freedman
(74) *Attorney, Agent, or Firm* — Tarolli, Sundheim, Covell & Tummino LLP

(57) ABSTRACT

The invention relates to an actuator subassembly (10) for a vehicle safety system comprising a pyrotechnic actuator unit (12) including an igniting portion (14) as well as a receiving element (16) forming a guide for the movable igniting portion (14) after activating the actuator unit (12). Further the invention relates to an airbag module of a vehicle safety system comprising said actuator subassembly (10) and a method of mounting a releasable tether (30) on an airbag module by means of said actuator assembly (10).

21 Claims, 4 Drawing Sheets

(56) References Cited

U.S. PATENT DOCUMENTS

| | | | | |
|---|---|---|---|---|
| 7,735,860 | B2* | 6/2010 | Fischer et al. | 280/739 |
| 7,980,591 | B2* | 7/2011 | Schonhuber et al. | 280/737 |
| 2009/0167006 | A1* | 7/2009 | Schonhuber et al. | 280/741 |
| 2009/0309342 | A1* | 12/2009 | Schonhuber et al. | 280/737 |

FOREIGN PATENT DOCUMENTS

| | | |
|---|---|---|
| DE | 60207674 | 7/2006 |
| EP | 1772323 | 4/2007 |
| WO | 2007065709 | 6/2007 |
| WO | 2007065715 | 6/2007 |

\* cited by examiner

ACTUATOR SUBASSEMBLY

FIELD OF THE INVENTION

The invention relates to an actuator subassembly for a vehicle safety system comprising a pyrotechnic actuator unit having an igniting portion. Moreover, the invention also relates to an airbag module of a vehicle safety system comprising an actuator subassembly of this type as well as a method of mounting a releasable tether at an airbag module by means of an actuator assembly.

BACKGROUND OF THE INVENTION

In engineering, especially in vehicle safety engineering, explosive studs are employed as actuator units. As a rule, they are extremely robust metal parts that are fastened by a thread and are capable of absorbing excessive forces. The required activating energy of these explosive studs is correspondingly high so that they expose housing orifices, displace component parts (sometimes against a pressing force) or cut themselves in two, for instance.

In the case of modern vehicle safety systems, especially in the case of airbag modules, it is endeavored to adapt the safety system more individually to different parameters of a crash situation. It is a known and advantageous possibility to make use of tensile means such as, e.g., tethers, by release of which flow orifices are opened or closed. Moreover, by such tensile means also the airbag geometry can be influenced and/or an additional airbag volume can be released.

For the active release of a tether a so-called tether activation unit "TAU" is required. Such TAU are usually stressed for shearing by comparatively small shear force loads. Conventional explosive studs are frequently oversized and too expensive for these applications.

For this reason, in WO 2007/065715 A1 for actuating a vehicle safety system pyrotechnic actuator units are disclosed already which have a plastic case and can be cheaply manufactured.

In WO 2007/065709 A1 furthermore an airbag module comprising an actuator unit in the form of a TAU is described in which a retaining means is provided to restrict the free mobility of a fragment separated after activation of the actuator unit. In this way, undesired contact with a vehicle occupant or damage of the airbag module by the separated fragment is largely excluded.

It is the object of the invention to provide a cheap and easily manufactured actuator subassembly that meets all safety requirements made to pyrotechnic actuators as regards movable components or fragments and at the same time can be easily mounted in a vehicle safety system

SUMMARY OF THE INVENTION

In accordance with the invention, this object is achieved by an actuator subassembly for a vehicle safety system comprising a pyrotechnic actuator unit having an igniting portion as well as a receiving element which constitutes a guide for the movable igniting portion after activation of the actuator unit. A portion in which an electric connector is connected to ignite a pyrotechnic charge of the actuator unit is referred to as igniting portion of the pyrotechnic actuator unit. The actuator unit is designed so that the igniting portion is movable at least after activation of the actuator unit. Since the receiving element forms a guide for the igniting portion, merely a restricted controlled movement is possible so that a contact of the igniting portion with the vehicle occupant or damage of the vehicle safety system is substantially excluded.

In a preferred embodiment, prior to its activation the actuator unit is undisplaceably fastened to the receiving element. Thus, in normal vehicle operation no annoying rattling or rubbing noise occurs.

In the receiving element preferably at least one stop is formed to restrict a movement of the igniting portion after activation of the actuator unit. Apart from the guide of the igniting portion, especially this restriction of movement contributes to the fact that the safety requirements made are met with respect to movable elements of pyrotechnic actuator units.

An embodiment of the actuator subassembly provides a tether fixed at the actuator unit prior to activation of the actuator unit. In this case, activation of the actuator unit usually serves to release the tether.

In the igniting portion preferably a pre-fabricated electric igniting unit including a pyrotechnic charge is accommodated. In this way, the pyrotechnic actuator unit can be manufactured at very low cost.

The receiving element of the actuator subassembly preferably is a plastic part, especially an integrally formed folding plastic part manufactured by injection molding. In this case both the material and manufacturing costs of the receiving element are minimal.

In another embodiment of the actuator subassembly the actuator unit includes the igniting portion and a holding portion which is firmly connected to the igniting portion prior to activating the actuator unit.

The igniting portion and/or the holding portion is/are preferably made of plastic material. Especially the portions can be welded or glued to each other. As an alternative, however, also manufacture in one piece or by a two-component injection molding process is possible.

Between the igniting portion and the holding portion preferably a predetermined breaking point is provided. Consequently, the actuator subassembly exhibits a foreseeable and very well reproducible activating behavior.

The holding portion is preferably firmly connected to the receiving element of the actuator subassembly prior to activating the actuator. Thus the actuator unit is mounted in the receiving element through the holding portion. Especially preferably even after activating the actuator unit the holding portion is firmly connected to the receiving element so that merely the igniting portion performs a pre-defined movement.

In another embodiment of the actuator subassembly the receiving element includes catch portions forming a snap fit with the holding portion. This snap fit permits a particularly simple mounting of the actuator unit on the receiving element.

The invention also relates to an airbag module of a vehicle safety system comprising an airbag, an inflator and an actuator subassembly of the afore-described type, the receiving element of the actuator subassembly being firmly connected to a modular component. The receiving element thus serves somewhat as adapter through which the pyrotechnic actuator unit can be easily attached to the modular component. As the receiving element restricts the movement of parts or fragments of the actuator unit after activation of the actuator unit, it contributes at the same time to meeting the safety requirements.

The receiving element is preferably engaged in the modular component. This snap fit permits simple and easy assembly of the actuator subassembly at the modular component.

The afore-mentioned modular component can be, for instance, the inflator, especially a diffuser portion of the inflator. The inflator has a sufficiently high mechanical stability in order to be capable of safely receiving the actuator subassembly. In case that the actuator assembly serves for releasing tethers, it is equally advantageous to mount the same to the inflator, because the tethers are usually fastened in the area of the inflator anyway to influence an airbag contour. Alternatively, the modular component can also be a modular housing, a generator cage etc., if the respective modular component has a sufficiently massive design to safely receive the actuator subassembly.

In a preferred embodiment of the airbag module a tether which is fixed at the actuator unit prior to igniting a pyrotechnic charge and is released after igniting the pyrotechnic charge is provided.

Finally the invention also relates to a method of mounting a releasable tether to an airbag module by means of an actuator subassembly, the method comprising the steps of:

a) arranging the tether at a pre-fabricated actuator unit of the actuator subassembly;

b) attaching the actuator unit in a receiving element of the actuator subassembly so that the tether is fixed at the actuator unit; and c) attaching the receiving element to a modular component of the airbag module.

In said mounting method merely the receiving element has to be adapted in the manner of an adapter to mount a desired actuator unit on a predetermined modular component. A complicated adaptation of the respective actuator units to be incorporated or of the respective modular components therefore can be dispensed with.

In an advantageous method variant, in step b) the pre-fabricated actuator unit is fastened to the receiving element by means of snap fit. As this snap fit can be easily brought about without any tool, this method step requires a minimum mounting effort.

Moreover, the receiving element can preferably be opened and closed, wherein the actuator unit in step b) is inserted in the opened receiving element while forming the snap fit and the snap-fit connection is secured against loosening when the receiving element is closed. Due to this securing of the snap-fit connection the actuator unit is attached to the receiving element in an extremely reliable manner.

Further, especially preferably also the closed receiving element is secured against opening by the modular component in step c).

This can be done, for instance, by the fact that a modular component portion for fastening the receiving element has a tubular shape and the receiving element includes shell parts which are inserted in the tubular portion.

Preferably in step c) the receiving element is attached to the modular component by means of a snap fit. Thus, by the specific design of the receiving element and the clever mounting method altogether a reliable fastening of the actuator subassembly at the modular component is achieved. At the same time, also all requirements made to safety concerning movable parts or fragments after activating the pyrotechnic actuator unit are met, as all movable parts of the actuator unit are retained in the receiving element. Since, furthermore, in the course of the method merely two snap fits have to be established, the mounting effort to be made is minimal.

Further features and advantages of the invention are resulting from the following description of a preferred embodiment with reference to the drawings.

DESCRIPTION OF THE EXAMPLE EMBODIMENT

Figure 1:
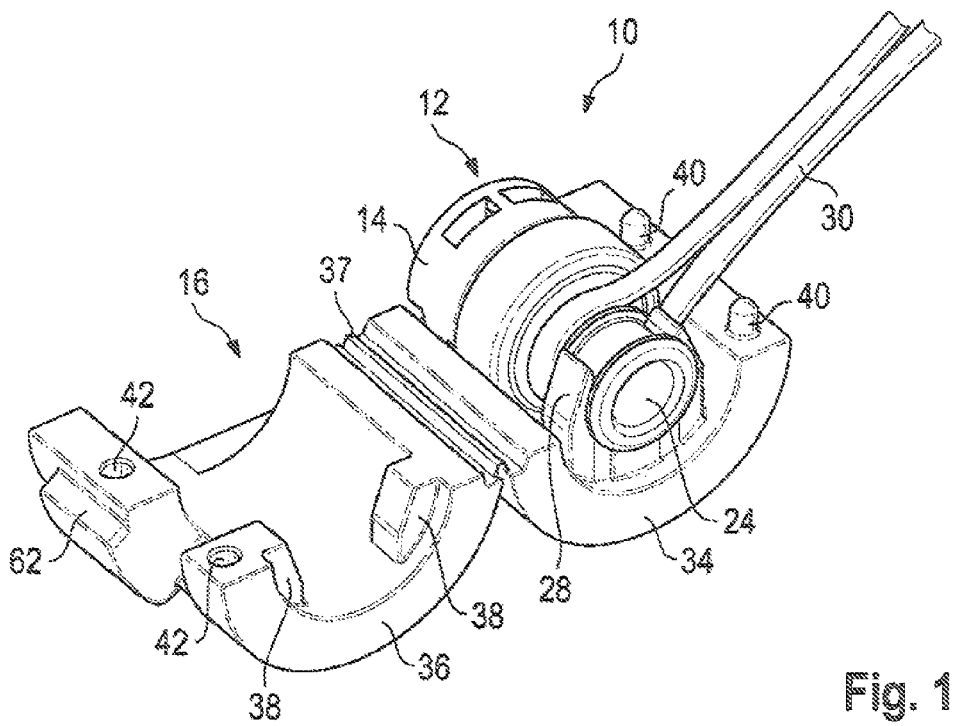
FIG. 1 shows a perspective view of the actuator subassembly according to the invention in the opened state.

FIG. 1 illustrates an actuator subassembly 10 for a vehicle safety system comprising a pyrotechnic actuator unit 12 having an igniting portion 14 as well as comprising a receiving element 16 forming a guide for the movable igniting portion 14 after activating the actuator unit 12. The pyrotechnic actuator unit 12 can especially be a pre-fabricated TAU (tether activation unit) mentioned in the beginning, as described, for instance, in WO 2007/065715A1, this document being expressly referred to in toto.

In the igniting portion 14 of the actuator unit 12 a pre-fabricated electric igniting unit 18 including a pyrotechnic charge 20 is received. The electric igniting unit 18, also referred to as igniter, and the pyrotechnic charge 20 are indicated in broken lines in the top view according to FIG. 2. Metallic contact pins 22 of the igniting unit 18 extend into a hollow of the igniting portion 14, the hollow forming a bushing for receiving a plug-in connector (not shown) which transmits the electric signal for igniting the pyrotechnic charge 20 to the pyrotechnic actuator unit 12. The hollow including the contact pins 22 is also clearly visible in FIG. 3 representing a rear view of the actuator subassembly 10.

Apart from the igniting portion 14, the pyrotechnic actuator unit 12 includes a holding portion 24 firmly connected to the igniting portion 14. The igniting portion 14 and/or the holding portion 24 has housing parts for the pre-fabricated electric igniting unit 18, said housing parts being preferably made of plastic material. Usually at least two separate housing parts are provided which are welded or glued together. In an especially preferred embodiment the housing parts are manufactured in a two-component injection molding process, wherein reference is made to WO 2007/065715 A1 in this context. Alternatively, it is also possible that the housing parts of the igniting portion 14 and of the holding portion 24 are formed integrally.

In the present embodiment a predetermined breaking point 26 is provided between the igniting portion 14 and the holding portion 24 of the actuator unit 12. Upon activation of the actuator unit 12, i.e. an ignition of the pyrotechnic charge 20, the actuator unit 12 breaks apart at said predetermined breaking point 26 so that the igniting portion 14 and the holding portion 24 are provided as separate parts or fragments.

Prior to its activation, the actuator unit 12 is undisplaceably attached to the receiving element 16 (cf. FIG. 1). To put it more exactly, the receiving element 16 includes for fastening the actuator unit 12 engaging portions 28 forming a snap fit with the holding portion 24. After activating the actuator unit 12 the holding portion 24 remains engaged with the receiving element 16, whereas the separated igniting portion 14 is movable. However, this mobility of the igniting portion 14 is strongly restricted by the hollow-cylindrical shape of the receiving element 16 and a stop formed in the receiving element 16. This will be discussed in more detail when describing the FIGS. 9 to 11.

Figure 2:
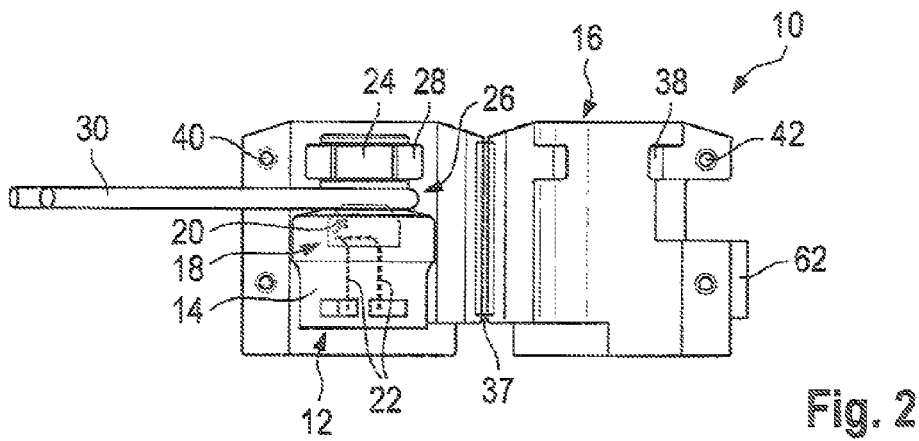
FIG. 2 shows a top view of the actuator subassembly according to FIG. 1.
Figure 3:
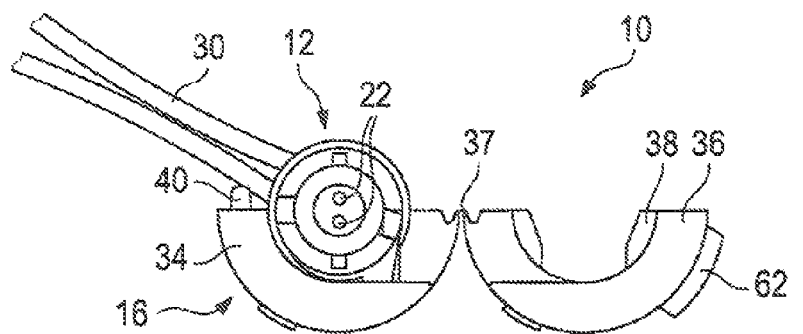
FIG. 3 shows a rear view of the actuator subassembly according to FIG. 1.

In addition to the actuator subassembly 10, in FIGS. 1 to 3 moreover a tether 30 can be seen which is fixed at the actuator unit 12, preferably in the area of the predetermined breaking point 26 of the actuator unit 12 prior to an ignition of the pyrotechnic charge 20. The mobility of the igniting portion 14 after activation of the actuator unit 12 is sufficient to release the tether 30.

Hereinafter by way of FIGS. 4 to 7 a method of mounting the releasable tether 30 at an airbag module 32 (cf. FIG. 8) by means of the actuator subassembly 10 is described.

In a first method step the tether 30 is arranged at the pre-fabricated actuator unit 12 of the actuator subassembly 10. Concretely speaking, a loop of the tether 30 is inserted and thus pre-fixed in the predetermined breaking point 26 of the actuator unit 12 formed as a groove.

Figure 4:
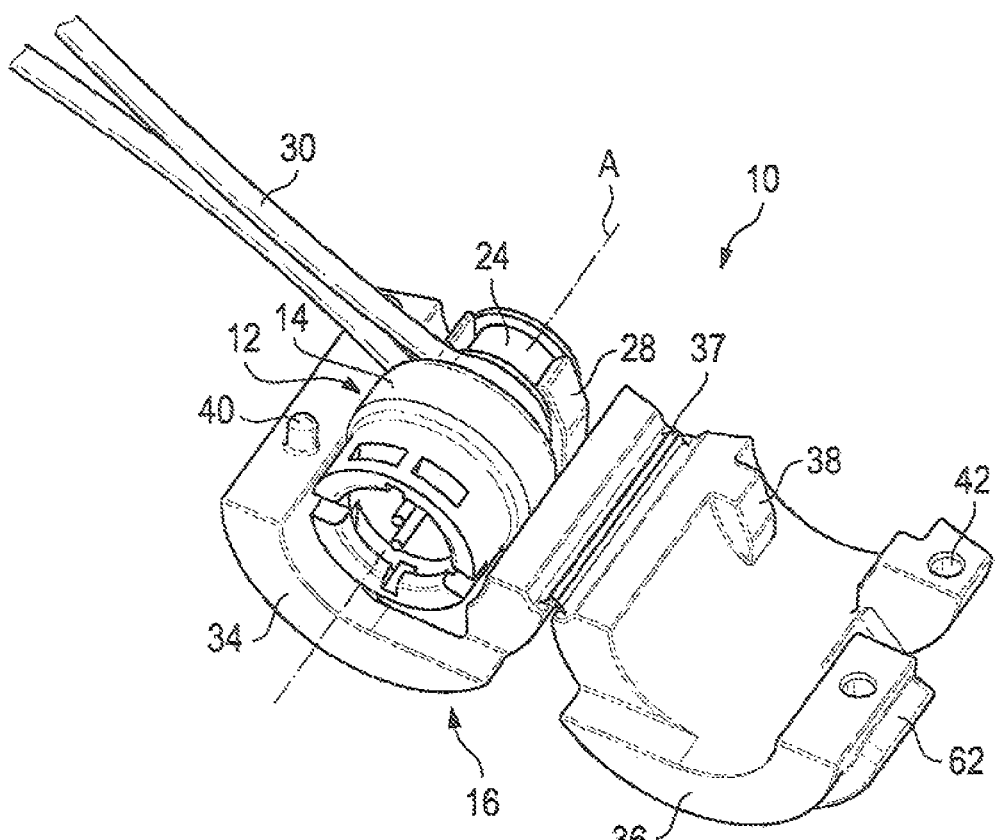
FIG. 4 shows another perspective view of the actuator subassembly according to the invention in the opened state.
Figure 5:
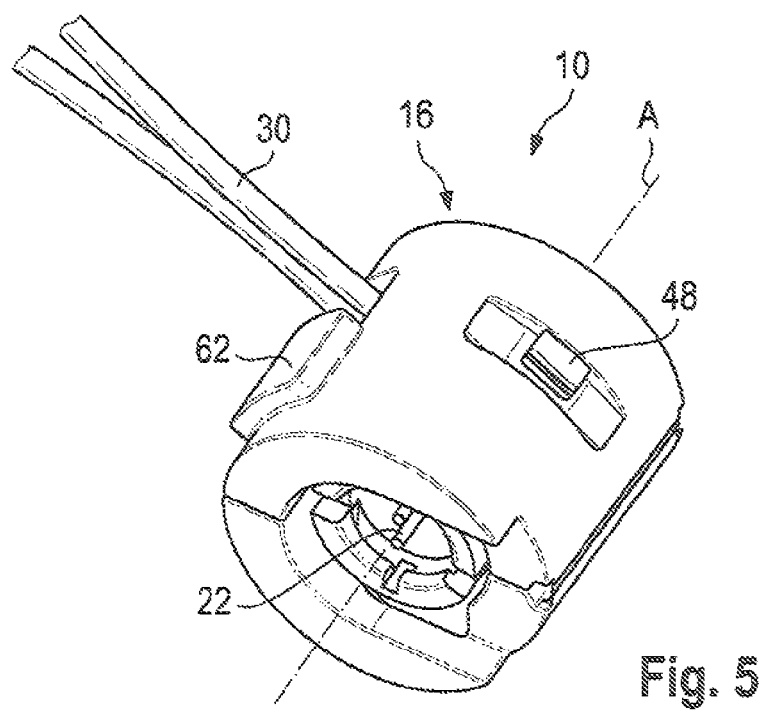
FIG. 5 shows a perspective view of the actuator subassembly according to FIG. 4 in the closed state.

In a second method step the actuator unit 12 is fastened along with the tether 30 in the receiving element 16 of the actuator subassembly 10 such that the tether 30 is fixed at the actuator unit 12 (cf. FIGS. 1 and 4). The pre-fabricated actuator unit 12 is preferably attached to the receiving element 16 by means of a snap fit. As evident in FIGS. 4 and 5, the receiving element 16 can be opened and closed, wherein the actuator unit 12 is inserted in the opened receiving element 16 in the second method step while forming the snap-fit connection and wherein the snap-fit connection is secured against loosening when the receiving element 16 is closed. In the present embodiment the receiving element 16 has an approximately hollow-cylindrical shape and has a longitudinal axis A. The receiving element 16 consists of two shell parts 34, 36 connected via a hinge 37 extending in parallel to the longitudinal axis A. In a first shell part 34 the resiliently movable engaging portions 28 are provided which extend radially outwardly when the actuator unit 12 is radially inserted and subsequently move toward each other again until the actuator unit 12 has finally reached an end position (FIGS. 1 and 4). In said end position the igniting portion 14 is adjacent to the wall of the hollow-cylindrical receiving element 16. Thus the tether 30 is secured in position by the receiving element 16 in the area of the predetermined breaking point 26 of the actuator unit 12. In a second shell part 36 securing projections 38 are provided in the same axial position as the engaging portions 28 of the first shell part 34, said securing projections preventing the engaging portions 28 from moving radially outwardly after the receiving element 16 is closed (FIG. 5). Thus the holding portion 24 of the actuator unit 12 is reliably fastened in the receiving element 16. The receiving element 16 encloses, in its closed position, the igniting portion 14 of the actuator unit 12 such that the igniting portion 14 is axially guided in the receiving element 16 after activation of the actuator unit 12. To obtain accurately fitting closing of the receiving element 16, positioning extensions 40 and corresponding positioning recesses 42 are provided at the shell parts 34, 36.

The receiving element 16 of the actuator subassembly 10 is preferably made of plastic material. In an especially preferred design, the receiving element 16 is a folding integrally formed injection molded part.

Figure 6:
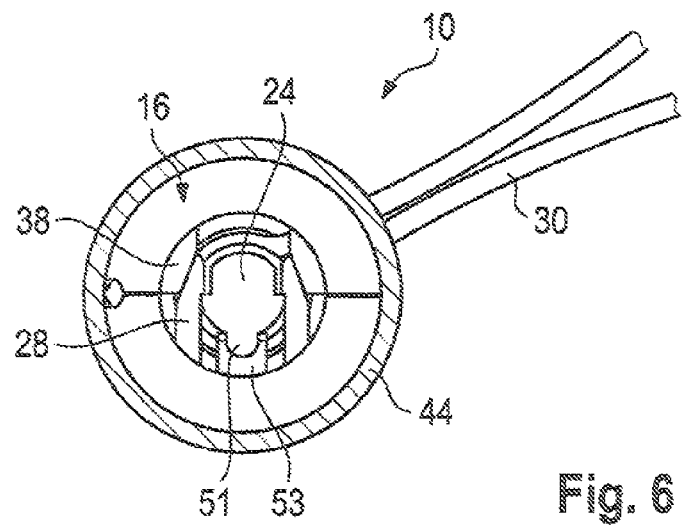
FIG. 6 shows a front view of the actuator subassembly according to the invention attached to a modular component.
Figure 7:
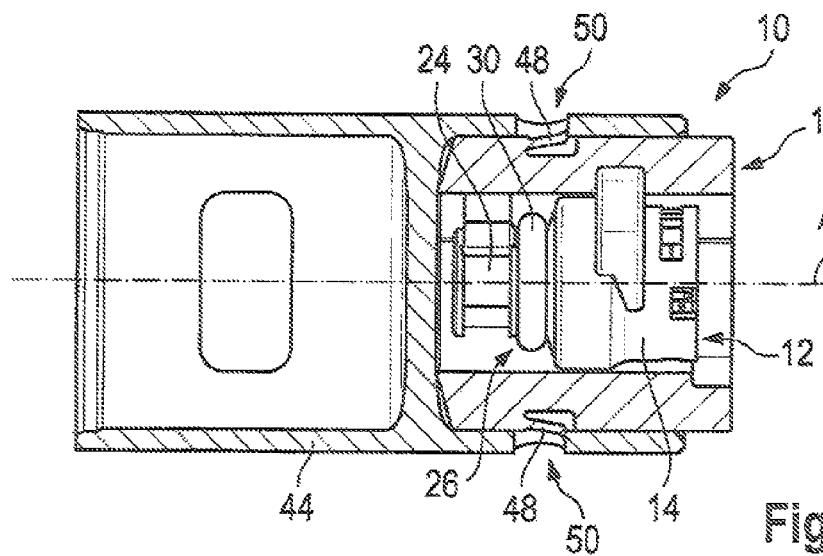
FIG. 7 is a sectional view of the actuator subassembly according to the invention attached to a modular component.

In a third method step, the receiving element 16 is finally attached to a modular component 44 of the airbag module 32 (cf. FIG. 7). With this attachment the closed receiving element 16 is secured against opening preferably by the modular component 44 in the third method step (cf. FIG. 6). This is possible in a simple manner in that a modular component portion has a tubular shape for attaching the receiving element 16 and the receiving element 16 is inserted with its shell parts 34, 36 in the tubular portion. In the exemplary embodiment according to FIG. 7 the modular component 44 is a diffuser of an inflator 46 (cf. also FIG. 8). The modular component portion for attaching the receiving element 16 is an axial extension of hollow-cylindrical shape integrally formed with the diffuser.

Especially preferably, the receiving element 16 is attached to the modular component 44 by means of a snap fit in the third method step (cf. FIGS. 5 and 7). To this effect, at an outside of the receiving element 16 radially movable engaging elements 48 are provided which deform radially inwardly when the actuator subassembly 10 is inserted in the modular component 44 until they snap radially outwardly in an end position of the actuator subassembly 10 and engage in orifices 50 provided in the modular component 44. By virtue of the accurate fit between the modular component 44 and the actuator subassembly 10, an unfolding of the receiving element 16 is excluded. Consequently, the actuator subassembly 10 on the whole and thus also the tether 30 is safely and reliably attached to the modular component 44 of the airbag module 32.

As it is evident in FIG. 6, at the holding portion 24 a guiding projection 51 is provided for engaging in a twist protection 53 formed at the receiving element 16 when the actuator unit 12 is fastened in the receiving element 16. In this way, the actuator unit 12 is fixed in circumferential direction relative to the receiving element 16.

Figure 8:
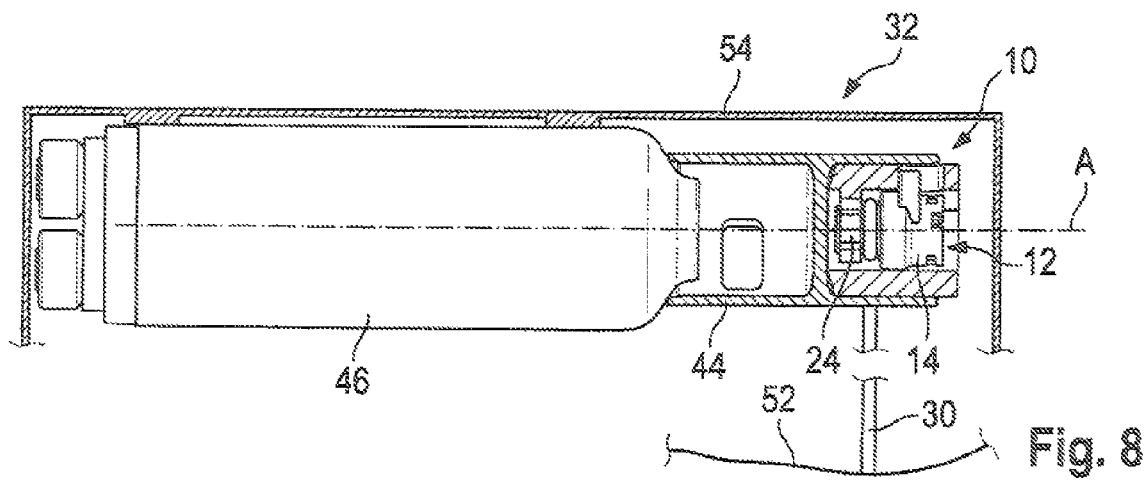
FIG. 8 is a sectional view of an airbag module according to the invention comprising an actuator subassembly according to the invention.

FIG. 8 illustrates the airbag module 32 of a vehicle safety system comprising an airbag 52, the inflator 46 and the mounted actuator subassembly 10, the receiving element 16 of the actuator subassembly 10 being firmly connected to the modular component 44, in this case the diffuser of the inflator 46. Preferably the modular component 44 for attaching the actuator subassembly 10 is the inflator 46, especially a diffuser portion of the inflator 46. As an alternative, the actuator subassembly 10 can also be attached to other modular components 44, such as, for instance, a modular housing 54, as a matter of course, if said modular component 44 has sufficient mechanical stability.

In accordance with FIG. 8, an axial end of the tether 30 is fixed at the pyrotechnic actuator unit 12 and an opposite axial end of the tether 30 is fixed at the airbag 52. Prior to activating the actuator unit 12, the airbag 52 consequently can be prevented from freely unfolding by the tether 30. After activating the actuator unit 12, the tether 30 is released so that the airbag 52 can freely unfold. As an alternative or in addition, also flow orifices (not shown) in the airbag 52 or in the modular housing 54 can be closed or freed by releasing the tether 30.

Figure 9:
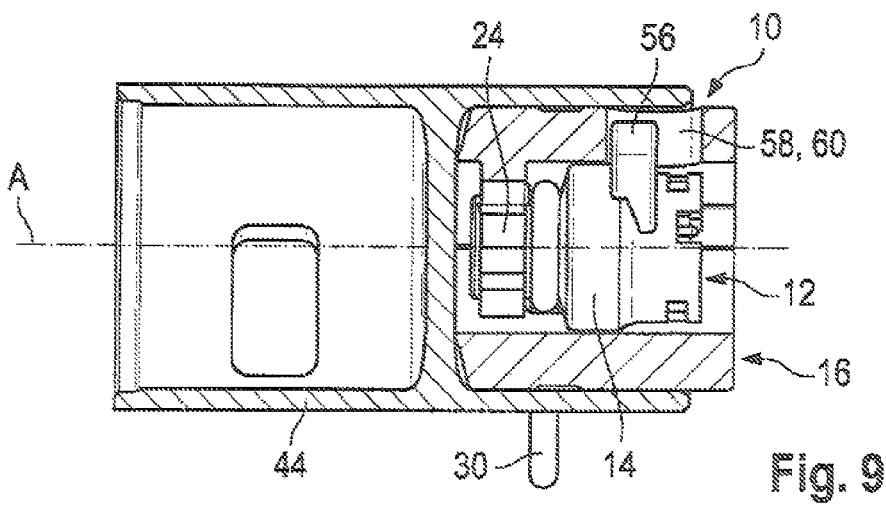
FIG. 9 shows a partial section across the airbag module according to FIG. 8 prior to activating the actuator unit.

FIG. 9 shows a sectional detail of the modular component 44 including the mounted actuator subassembly 10 prior to activating the pyrotechnic actuator unit 12. The holding portion 24 of the actuator unit 12 is firmly connected to the igniting portion 14 and the tether 30 is fixed at the actuator unit 12 in the area of the predetermined breaking point 26.

The igniting portion 14 includes a radial projection 56 engaging in a recess 58 of the receiving element 16.

Figure 10:
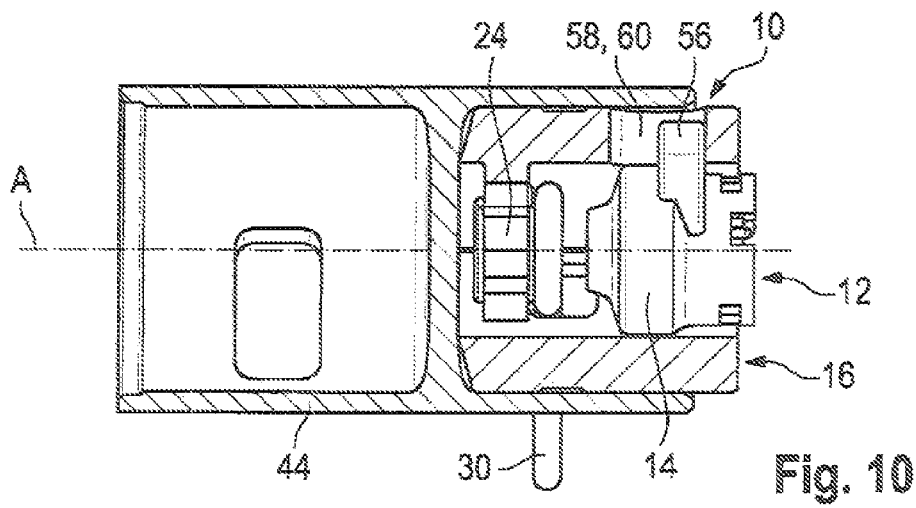
FIG. 10 shows a partial section across the airbag module according to FIG. 8 after activating the actuator unit.

FIG. 10 shows the same detail section as FIG. 9, yet after activating the actuator unit 12. By igniting the pyrotechnic charge 20 the actuator unit 12 breaks apart at the predetermined breaking point 26, viz. into the holding portion 24 still fixed at the receiving element 16 and the now movable igniting portion 14. The igniting portion 14 is linearly guided in the receiving element 16 and is moved axially to the right due to the gas pressure formed upon igniting the pyrotechnic charge 20 (FIG. 10). Accordingly, also the projection 56 moves to the right in the recess 58, until it abuts on the edge of the recess 58. The recess 58 consequently forms a stop 60 for the projection 56 and thus for the igniting portion 14 so that the axial mobility of the igniting portion 14 is restricted by the receiving element 16.

Figure 11:
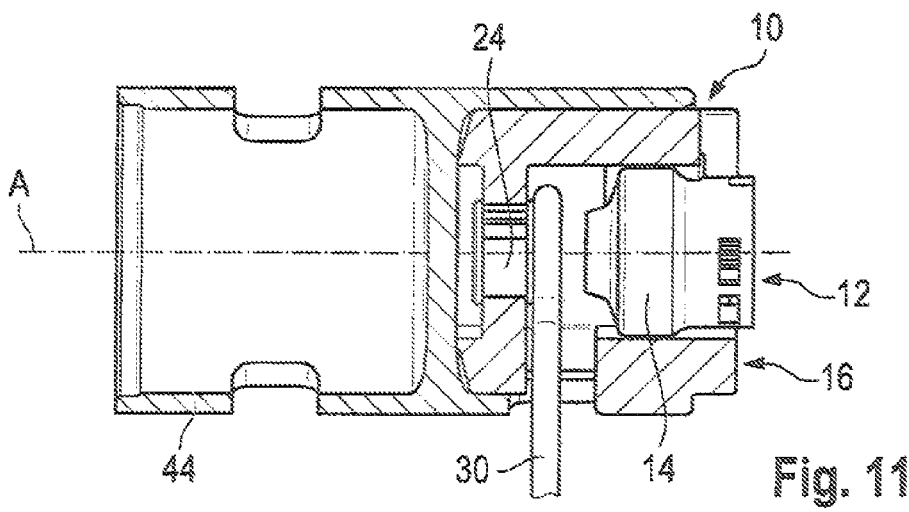
FIG. 11 is another partial section across the airbag module according to FIG. 8 after activating the actuator unit.

The movement of the igniting portion 14 away from the holding portion 24 is sufficient, however, to release the tether 30. FIG. 11 shows a detail section across the modular component 44 including the mounted actuator subassembly 10 and the tether 30, wherein it becomes clear that the end of the tether 30 originally fixed at the actuator unit 12 can be pulled out of the actuator subassembly 10 through orifices in the receiving element 16 and in the modular component 44 and is thus released. The orifice in the modular component 44 can be a slit in which a guiding catch 62 of the receiving element 16 engages when mounting the actuator subassembly 10 so that the substantially cylindrical actuator subassembly 10 is also fixed in circumferential direction relative to the modular component 44.

The actuator subassembly 10 can be easily and cheaply manufactured, permits simple though reliable mounting at the modular component 44 of the airbag module 32 by means of only two snap-fit connections and ultimately allows releasing the tether 30 in a reliable manner while complying with all safety requirements concerning movable parts or fragments in pyrotechnic actuator units 12.

The invention claimed is:

1. An actuator subassembly for a vehicle safety system comprising
    a pyrotechnic actuator unit (12) including a holding portion (24) and a an igniting portion (14) actuatable to rupture the actuator unit (12) and separate the holding portion (24) from the igniting portion (14); and
    a receiving element (16) that holds the actuator unit (12) and forms a guide for permitting movement of the igniting portion (14) longitudinally relative to the holding portion (24) after activation and rupture of the actuator unit (12), wherein the rupture releases a member (30) that is held in the receiving element (16) due to an engagement between the member (30) and the holding portion (24).

2. An actuator subassembly according to claim 1, characterized in that prior to its activation the actuator unit (12) is undisplaceably attached to the receiving element (16).

3. An actuator subassembly according to claim 1, characterized in that in the receiving element (16) at least one stop is formed to restrict movement of the igniting portion (14) after activation of the actuator unit (12).

4. An actuator subassembly according to claim 1, characterized in that the member comprises a tether (30) fixed at the actuator unit (12) prior to activation of the pyrotechnic actuator unit (12.

5. An actuator subassembly according to claim 1, characterized in that in the igniting portion (14) a pre-fabricated electric igniting unit (18) including a pyrotechnic charge (20) is received.

6. An actuator subassembly according to claim 1, characterized in that the receiving element (16) is a plastic part.

7. An actuator subassembly according to claim 1, characterized in that the igniting portion (14) and holding portion (24) are firmly connected to each other prior to activating the actuator unit (12).

8. An actuator subassembly according to claim 7, characterized in that the igniting portion (14) and/or the holding portion (24) are made of plastic material.

9. An actuator subassembly according to claim 7, characterized in that the holding portion (24) is firmly connected to the receiving element (16) prior to activating the pyrotechnic actuator unit (12).

10. An actuator subassembly according to claim 7, characterized in that the receiving element (16) includes engaging portions (28) forming a snap fit with the holding portion (24) such that the holding portion (24) and receiving element (16) do not move relative to one another due to activation of the actuator unit (12).

11. An airbag module of a vehicle safety system comprising
    an airbag (52),
    an inflator (46) and
    an actuator subassembly (10) according to claim 1,
    characterized in that the receiving element (16) of the actuator subassembly (10) is firmly connected to a modular component (44).

12. An airbag module according to claim 11, characterized in that the receiving element (16) is engaged in the modular component (44).

13. An airbag module according to claim 11, characterized in that the modular component (44) is the inflator.

14. An airbag module according to claim 11, characterized in that the actuator unit (12) includes a pyrotechnic charge (20) and that the member comprises a tether (30) is provided which is fixed at the actuator unit (12) prior to igniting the pyrotechnic charge (20) and is released after igniting the pyrotechnic charge (20).

15. An actuator subassembly according to claim 1, characterized in that upon activation of the pyrotechnic actuator unit (12) the holding portion (24) maintains a fixed connection with the receiving element (16) and the igniting portion (14) moves relative to the holding portion (24).

16. An actuator subassembly according to claim 1, characterized in that the receiving element (16) extends along a longitudinal axis (A), the igniting portion (14) moving along or parallel to the longitudinal axis (A) and relative to the holding portion (24) upon activation of the pyrotechnic actuator unit (12).

17. An actuator subassembly according to claim 1, wherein the actuator unit(12) comprises a predetermined breaking point (26) between the igniting portion (14) and the holding portion (24), the member being released through a space between the igniting portion (14) and the holding portion (24) upon rupture of the breaking point (26).

18. An actuator subassembly for a vehicle safety system comprising
    a pyrotechnic actuator unit (12) including a holding portion (24) and a movable igniting portion (14),
    a receiving element (16) that holds the holding portion (24) and forms a guide for the movable igniting portion (14) after activation of the actuator unit (12), and
    a tether (30) held within the receiving element (16) by the pyrotechnic actuator unit (12) and released from the receiving element through a space between the holding portion (24) and the igniting portion, the holding portion

(24) and igniting portion (14) breaking apart from each other when the pyrotechnic actuator unit is activated.

19. An apparatus for securing a tether in a vehicle, comprising:

a receiving element (16) connectable with the vehicle; and a pyrotechnic actuator unit (12) including a holding portion (24) secured to the receiving element (16) and an igniting portion (14) actuatable to rupture the actuator unit (12) and separate the holding portion (24) from the igniting portion (14);

the receiving element (16) receiving the actuator unit (12) and the tether (30), the actuator unit (12) when received in the receiving element (16) engages the tether (30) to connect the tether (30) to the receiving element (16);

the receiving element (16) forming a guide for permitting movement of the igniting portion (14) longitudinally relative to the holding portion (24) while the holding portion (24) remains secured to the receiving element (16) after activation and rupture of the actuator unit (12), which disconnects the tether (30) from the receiving element (16).

20. An actuator subassembly according to claim 19, wherein the actuator unit (12) extends through a loop in the tether (30) to connect the tether (30) to the receiving element (16).

21. An actuator subassembly according to claim 19, wherein the receiving element (16) includes engaging portions (28) that maintain the holding portion (24) in the same position before and after actuation of the pyrotechnic actuator unit (12).

* * * * *